United States Patent [19]

Bosson et al.

[11] Patent Number: 5,117,082

[45] Date of Patent: May 26, 1992

[54] DEVICE AND PROCESS FOR CONTROLLING THE VARIATION OF A PARAMETER IN EDM MACHINING WITH AN ELECTRODE-WIRE

[75] Inventors: Jean M. Bosson, Annemasse, France; Juan Odriozola, Chatelaine, Switzerland; Georges-André Marendaz, Borex, Switzerland; Daniel Blodin, Bernex, Switzerland

[73] Assignee: Charmilles Technologies S.A., Meyrin, Switzerland

[21] Appl. No.: 465,051

[22] Filed: Jan. 16, 1990

[30] Foreign Application Priority Data

Jan. 13, 1989 [CH] Switzerland ............... 00099/89

[51] Int. Cl.$^5$ ............... B23H 7/02; B23H 7/06; B23H 7/20
[52] U.S. Cl. ............... 219/69.12
[58] Field of Search ............... 219/69.12, 69.13, 69.17, 219/69.18; 364/474.04

[56] References Cited

U.S. PATENT DOCUMENTS

| | | | |
|---|---|---|---|
| 4,081,652 | 3/1978 | Jänicke et al. | 219/69.12 |
| 4,383,159 | 5/1983 | Inoue | 219/69.12 |
| 4,495,038 | 1/1985 | Inoue | 219/69.12 |
| 4,510,366 | 4/1985 | Inoue | 219/69.17 |
| 4,546,227 | 10/1985 | Gamo et al. | 219/69.12 |
| 4,581,513 | 4/1986 | Obara et al. | 219/69.12 |
| 4,703,143 | 10/1987 | Okubo et al. | 219/69.12 |
| 4,773,030 | 9/1988 | Delpretti | 219/69.13 |
| 4,800,248 | 1/1989 | Futamura et al. | 219/69.18 |
| 4,837,415 | 6/1989 | Magara et al. | 219/69.12 |
| 4,868,760 | 7/1989 | Obara | 219/69.12 |

FOREIGN PATENT DOCUMENTS

| | | | |
|---|---|---|---|
| 57-66827 | 4/1982 | Japan | 219/69.13 |
| 654233 | 2/1986 | Switzerland . | |

*Primary Examiner*—Geoffrey S. Evans
*Attorney, Agent, or Firm*—Gifford, Groh, Sprinkle, Patmore and Anderson

[57] ABSTRACT

At least one machining parameter of an electrode-wire EDM machine, cutting according to a predetermined trajectory, is varied when the electrode-wire reaches the apex of an angle or approaches an arc. The process consists of the following stages:

1) calculation of the locations along the trajectory or path at which these variations must be started;
2) stopping of relative electrode-wire movement and the work-piece, when the wire reaches one of these points;
3) gradual and stepped variations of the parameter up to a final designated value or until a predetermined number of steps have been performed, or during a given period of time;
4) resumption of wire-part relative movement, with the new parameter value over a computed predetermined distance, and
5) variation of the parameter in the opposite direction so as to return it to its initial value.

The durations of the steps are predetermined or correspond to cutting of predetermined lengths along the path.

21 Claims, 2 Drawing Sheets

DEVICE AND PROCESS FOR CONTROLLING THE VARIATION OF A PARAMETER IN EDM MACHINING WITH AN ELECTRODE-WIRE

This invention deals with a device and a control process for an EDM machine with an electrode-wire, using automatic modification, at certain moments in the machining process, of at least one machining parameter.

Most known methods (for example CH 590.107, U.S. Pat. No. 4,703,143, EP 67 876, Japanese publications 51-85, 589, 58-40229, 58-28 430) make therefore use of machining speed modification.

But all these methods do not diminish the fault appearing just after the apex of the angles; Swiss patent 654.233 also recommends decreasing the machining speed prior to reaching the apex of an acute angle, and to conserve reduced machining speed for a predetermined period of time after having passed the apex.

The regulation of the machining speed disclosed in the state of art is generally obtained:

either without or interrupt the machining, gradually by maintaining the wire feed, or in only one step after having stopped the wire feed.

For example, it has been proposed to vary the machining speed either gradually, and during a given time period (CH 654.233) or over a predetermined length of the path followed (JP 58-40229), while maintaining wire feed, or by stopping wire feed, and modifying the speed or rate and machining for a predetermined time, at a reduced rate and stationary machining in the case of an angle, or machining at low speed in the case of an arc; this speed or duration is calculated according to the slack of the wire along a straight line, which is determined by stopping machining (EP 67 876), or this period is that demanded for disappearance of slack (U.S. Pat. No. 4,703,143).

None of these publications mention that it is advantageous to vary the speed or rate gradually, even if this variation is obtained during stationary machining.

It seems that the experts expect these gradual modifications of a parameter during the stop of the wire feed would demand too much time and increase therefore the time the required for machining. It is for this reason, and in particular when machining at high speed, the state of the art, for example U.S. Pat. No. 4,725,707 recommends sudden changes in rate, and never associates feed stoppage with a gradual simultaneous variation of a parameter.

The purpose of the present invention is automatic regulation of at least one machining parameter, enabling faster machining than with known methods, while avoiding short-circuits or wire breakage and obtaining adequate precision in the angles of machined parts.

This regulation should enable satisfactory geometry to be obtained, whether the trajectory presents convex or concave curves or broken lines with inside or outside edges.

Figure 1:
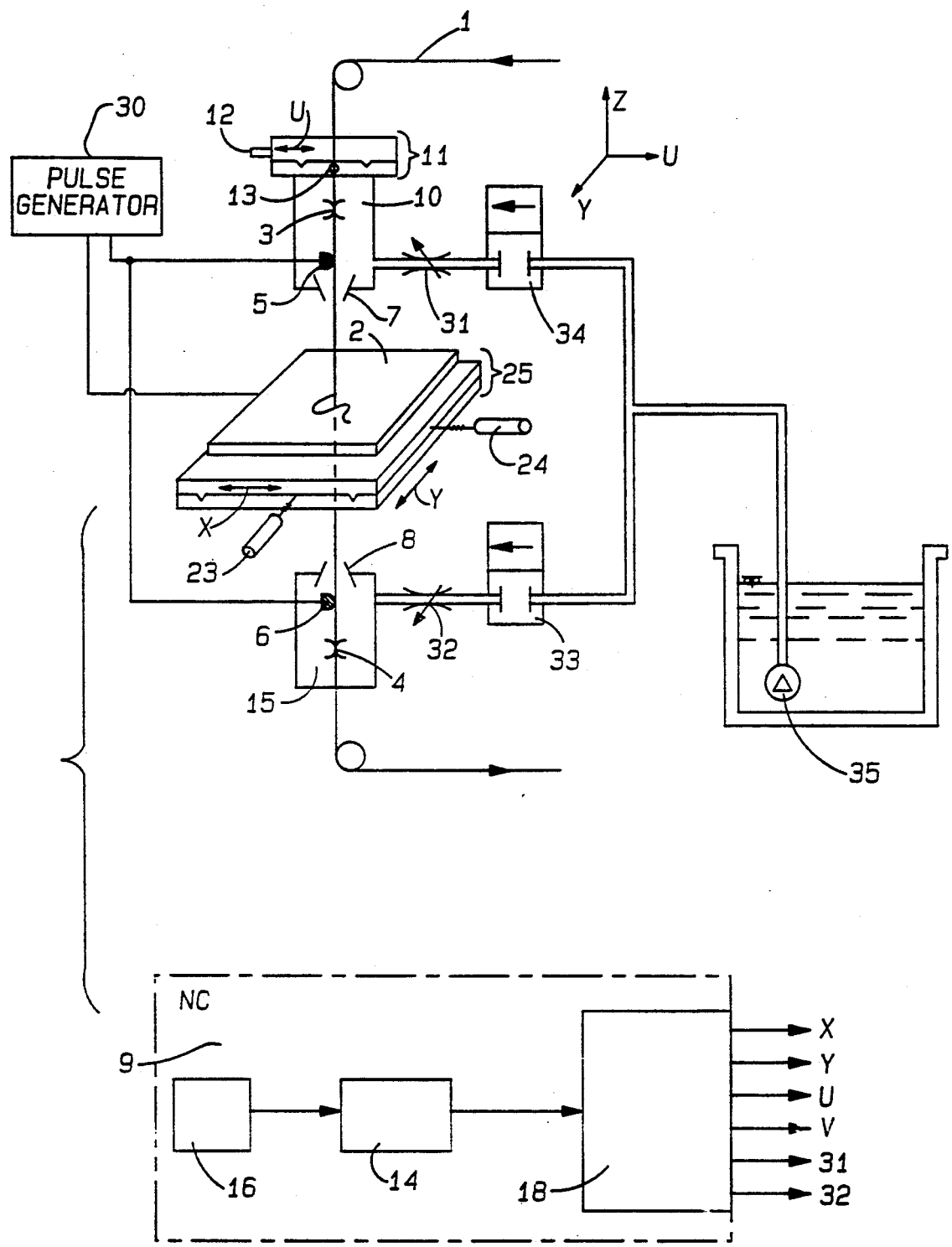
FIG. 1 shows the first embodiment of the invention.

Let us briefly review the operation of an electrode-wire EDM machine, such as that illustrated in FIG. 1:

an electrode-wire 1 passes continuously between two wire guides 3 and 4 arranged on either side of the part to be machined 2. due to mechanisms (not shown) driving the wire while braking it so as to provide it with a predetermined mechanical tension. Two rubbing contacts 5 and 6 conduct the machining current, emitted by pulse generator 30, to the electrode-wire, while two injection nozzles 7 and 8 direct the machining liquid jets along wire 1 and into the slot cut in part 2 by the wire;

wire guide 3, nozzle 7, and upper contact 5 are arranged in work head 10, mobile along the vertical axis Z, and, in general, also mobile (along relatively short travels) in a horizontal plane, according to two orthogonal axes U and V, enabling the wire to be inclined, while the lower wire guide 4 remains fixed. This movement (U, V) is obtained by a crossed movement table 11, actuated by a servo mechanism (of known type, but not shown) including the two motors 12 and 13. The bottom work head 15 containing the lower wire guide 4, lower nozzle 8 and lower contact 6, remains fixed with respect to the machine structure;

the part to be machined 2 is attached by its mechanism, not shown, to a table which is itself attached to the bottom of the work tank (not shown) filled with the machining liquid. The latter is mobile according to two horizontal and orthogonal axes X and Y by means of a crossed movement table 25, actuated by a servo mechanism (of known type, not shown) including two motors 23 and 24;

the cutting trajectory is stored on a data processing medium 16, which sends its data to computer unit 14 of numerical control 9. The latter also features an appropriately programmed unit, at least one memory and a drive, together with installation 18 (processor or interpolator) monitoring and controlling the relative movements between the workpiece 2 and electrode-wire 1, by actuating motors 12, 13, 23 and 24, and monitoring other machining parameters such as machining liquid injection pressure, by activating solenoid valves 31 and 32. The computing unit 14 evaluates the cutting trajectory and sends control signals to interpolator 18 intended to distribute the movements along both directions X and Y, activated by motors 23 and 24;

the pulse generator 30 is connected between two electrodes 1 and 2 so as to emit successive voltage pulses intended to start discharges in the machining area. It receives signals from numerical control 9 (link not shown), for example, to control a given variation in pulse frequency, voltage or spark duration; and the dielectric tank feeds the work tank and the injection circuits to nozzles 7 and 8 of the work heads. These are shown diagrammatically in FIG. 1 by pump 35 and solenoid valves 31 and 32 connected to the liquid distributor valves 33 and 34.

The above-mentioned objective is achieved by using the following strategy gradually to vary the parameter to be modified, this modification being, for example, a decrease:

the relative movement between the wire and part is stopped, but the generator continues sending pulses into the wire;

the value V of the parameter to be modified is decreased, for example the frequency of the pulses emitted by the generator, by a given quantity $Q_1$;

at the end of a predetermined period $\Delta t_1$, this parameter is again decreased by a quantity $Q_2$;

at the end of a further period $\Delta f_2$, the parameter is decreased by $Q_3$, and so on until this parameter is reduced to a scheduled value V', after n decrements;

the relative movement between the wire and the workpiece is restarted; the modified parameter being in general a factor of the discharge power, its reduction results, in this case, in a decrease of the feed rate obtained automatically by the servo-mechanisms actuating the relative movement;

machining is continued at this reduced rate over distance lo of the trajectory;

then, without it being necessary to stop relative movement, the value of the parameter is increased by a given quantity $Q'_1$;

after the end of a period $\Delta f_1$, the parameter is increased by a quantity $Q'_2$ and so on in the form of $n'$ successive increases;

when the parameter reaches value V again, machining is continued at the initial rate.

In this manner, a double gradual variation of the machining rate is obtained in steps. The same strategy can be used to increase a parameter in stationary machining (for example wire mechanical tension), then bringing it back to its initial value by decreasing it while having reestablished wire feed (dynamic machining). The durations of these steps are predetermined. These may be constant for several successive steps, or vary according to a preestablished function. In the case of the phase of variations performed during dynamic machining, these may correspond to cutting of predetermined lengths along the trajectory. This gives, for example $\Delta t_1 = \Delta t_2 = t\Delta_x$.

Quantities $Q_1, \ldots, Q_x$ and $Q'_1, \ldots, Q'_x$ may be equal, but are in general different for each of the decrements and increments performed, preferably $Q_{x+1} < Q_x$ and $Q'_{x+1} > Q'_x$.

When the step times in the dynamic machining variation phase (in which the parameter is returned to its initial value after machining an angle or an arc) corresponds to the time taken by the wire to machine predetermined lengths along the path, the device also includes means equipped to send a signal to the numerical control unit as soon as the wire has cut a predetermined length, from a given point on the trajectory or since a given time. This point or time corresponds, for example, to the start of this dynamic machining phase or the start of a step, i.e. the last elementary variation of the parameter.

As in patent CH 654.233, the device of the present invention can be used to gradually modify parameter having an effect on geometry, such as the frequency of the pulses emitted by the generator, and to measure the mean machining voltage. But, instead of decreasing the parameter and continuing wire feed, this variation is performed in the stationary mode. Therefore, it is no longer necessary to correct the feed speed as a function of the successive values of mean machining voltage, so as to keep the sparking distance constant, since the feed rate is null;

instead of reducing the feed speed already on approaching the apex of an angle, the feed speed is not reduced until after the apex.

Suprisingly, this process of interrupting the wire feed and varying the machining condition by steps in the stationary mode significantly reduces the machining times of an edge or arc, with automatic variation in parameters with respect to machining operations performed according to a procedure in which the variation is made during the wire feed.

Generally, the parameter V is one of the machining mode factors, in particular the power of the pulses emitted by the generator, such as the frequency of these pulses, machining current, sparking time or sparking voltage. Preferably, this variation can be accompanied by that of one or more other parameters, for example variation in liquid injection pressure and/or wire mechanical tension and/or wire speed of movement. In particular, this enables the effect of the decrease in pulse frequency on wire slack to be reinforced.

The quantities by which the parameter(s) V is/are varied at each step, together with the number of these steps or the overall durations of the steps of a variation in a given direction, or the final value $V'(X)$ reached by the parameter(s) before cutting an angle, durations $\Delta t_x$ and $\Delta t'_x$ of the steps or lengths $\Delta l_1$ were, for example, predetermined experimentally, choosing values providing satisfactory geometry for the part, with cutting of an arc or angle as rapidly as possible, while avoiding short-circuits.

Figure 2:
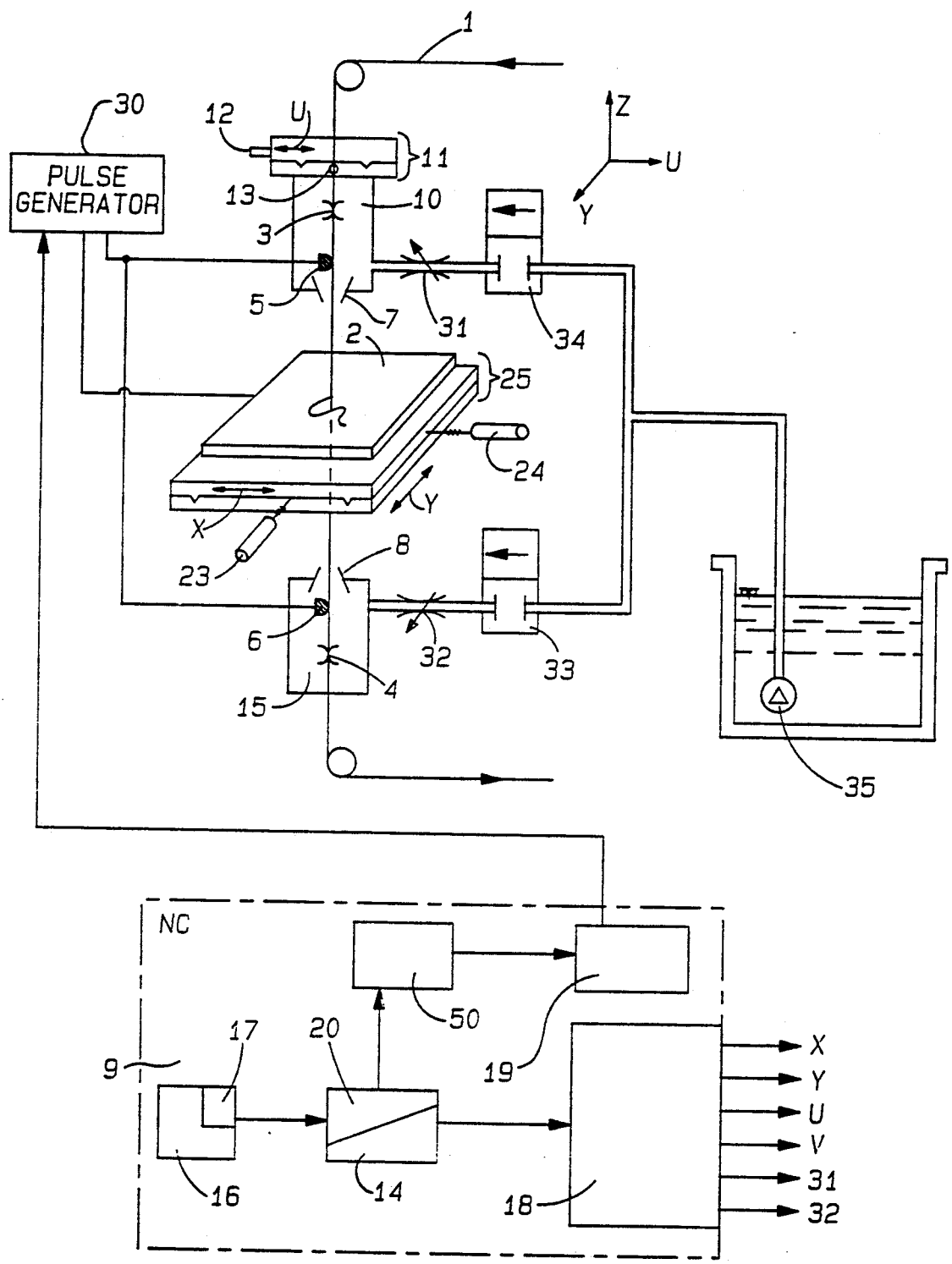
FIG. 2 shows the second embodiment of the invention.

In general, these values are stored in an appropriate element 17 (see FIG. 2) of data processing medium 16 connected to computing unit 14 of numerical control 9 of the EDM machine. These are a function of the material pair and/or height of the workpiece, and/or material or geometry of the electrode-wire.

When cutting an arc, the greater the radius of curvature, the less it will be necessary to decrease the rate, and therefore the parameter so as to obtain correct geometry. It is possible to stop at an intermediate step corresponding to a reduced value $V(x)$ of the first parameter, instead of continuing up to $V'$. In other words, $V(x)$ and n depend on this radius; the higher the radius, the nearer $V(x)$ to initial value V of the parameter and the smaller n; conversely, the shorter the radius, the nearer $V(x)$ to value $V'$ corresponding to cutting of an angle, and the greater n.

The term "angle" designates both a sharp edge and a rounded edge, the radius or curvature of which is of the same order of magnitude as the radius of the electrode-wire, or less than this radius. The points on the trajectory in which the automated device, which is the subject of the present invention, must be implemented are determined by an appropriately programmed computing element, fitted out to send a first signal activating starting of this automated device, i.e. stopping of the wire-part relative movement, then a second signal, when the wire has travelled length $l_o$ along the path, machining with the parameter reduced to value $V(x)$. This second signal will actuate the beginning of successive increases in machining rate. Calculation of $l_o$ will be different for an arc or an angle.

According to a preferred option,
in the case of an $\alpha$, the computing element is programmed to computer $l_o$ as being equal to:

$$l_o = \frac{\text{wire radius } R + \text{gap } g}{\tan \alpha/2}$$

in the case of an arc with a radius of curvature r, this computing element is programmed to compute $l_o$ as being equal to:

$$l_o = \gamma r,$$

where $\gamma$ is the angle, in radians, corresponding to this arc.

Therefore, $l_o$ depends only on the wire geometry and diameter, and not on the material of the electrodes and the thickness of the part.

Determination of $l_o$ and sending of signals to the numerical control in order to actuate the gradual rate variations at the end of each internal $t_x$ are performed by the computing element without the intervention of a programmer. This element analyzes the trajectory or path stored (by being, in particular, programmed to follow changes in the radius of curvature of this trajectory) and to perform simple calculations such as those shown in the example above.

Below, the invention shall be illustrated by one of the possible applications, described solely as an example, but without being limited to this example.

According to this example, the pulse frequency is varied.

Experimentally, it was determined that the geometry is satisfactory and that short-circuits are avoided in an angle for a reduced frequency $F(X) = F/8$, where F is the nominal machining rate pulse frequency, i.e. the rate used in machining before approaching this angle or an arc of low radius of curvature. Also, it was experimentally determined that at least 4 successive decreases are required to change from nominal frequency F to reduced frequency F/8, so as to cut an edge or angle of satisfactory geometry.

Also, the relationship between the radius of curvature r of an arc and the corresponding reduced frequency value F(x), or the number n of elementary variations, as shown in the table below, were also experimentally determined (and generally stored either on element 17 of data processing medium 16 of the EDM machine, or on one of the media containing the technological tables, and which may be entered interchangeably in the numerical control).

| r in mm | F(X) | n |
|---|---|---|
| 0 | $F(X) = F/8$ | 0 |
| $0 < r < 0.25$ | $F(X) + Q_4 = F/4$ | 3  $Q_4 = F/8$ |
| $0.25 < r < 0.75$ | $F(X) + Q_3 + Q_4 = F/2$ | 2  $Q_3 = F/4$ |
| $0.75 < r < 1$ | $F(X) + Q_2 + Q_3 + Q_4 = 3F/4$ | 1  $Q_2 = F/4$ |
| $1 < r$ | $F(X) + Q_1 + Q_2 + Q_3 + Q_4 = F$ | 0  $Q_1 = F/4$ |

The duration of the steps used for this decrease is constant. In particular, it depends on the height H of the workpiece, as shown in the table below:

| H mm | | | | | | | | | | | | | | | | |
|---|---|---|---|---|---|---|---|---|---|---|---|---|---|---|---|---|
| 5 | 10 | 20 | 30 | 40 | 50 | 60 | 70 | 80 | 90 | 100 | 110 | 120 | 130 | 140 | 150 | 160 |
| Δt s | | | | | | | | | | | | | | | | |
| 0.25 | 0.5 | 1 | 1.5 | 2 | 2.5 | 3 | 3.5 | 4 | 4.5 | 5 | 5.5 | 6 | 6.5 | 7 | 7.5 | 8 |

In this example, the part is 80 mm high, therefore Δt was chosen as =4 seconds.

Durations Δt′ of the steps observed to increase the frequency after having run distance lo correspond to the time taken by the wire to machine a same length Δl of the trajectory during each of these steps. These lengths Δl (in durations Δt′) also depend on height H of the part, as shown in the table below:

| H mm | | | | | | | | | |
|---|---|---|---|---|---|---|---|---|---|
| <10 | 10 | 20 | 30 | 40 | 50 | 60 | 70 | 80 | >80 |
| Δl μm | | | | | | | | | |
| 50 | 60 | 60 | 70 | 70 | 80 | 80 | 100 | 100 | 100 |

In this example, in which the part height is 80 mm, durations Δt′ such that Δl = 100 μm will be obtained.

First of all, we shall describe machining of an angle (or edge): the wire machining the part at a rate such that the pulse frequency f of the pulses have value f at the apex of an angle (i.e. the ideal line joining the two wire guides arrive at this apex); element 20 of computing unit 14, which is programmed for this purpose sends a signal A to control unit 18 of numerical control 9, which stops the relative wire-part movement;

and engages circuit 50; the latter sends a first signal to unit 19 of numerical control 9, which is programmed so as to actuate a first decrease $Q_1 = F/4$ in frequency f, and then sends a new signal every 4 seconds, via element 17 (on which this duration Δt=4 seconds was stored), and to which it is connected by means of element 20. This new signal send to element 19 causes decrementation of frequency f by quantity $Q_2 = F/4$ (step 1). Thus, frequency f is successively decremented by quantities $Q_3 = F/4$ and $Q_4 = F/8$ so as to obtain a frequency equal to F/8, therefore, in this example, after having performed 4 elementary frequency variations, observing 3 steps of the same duration, i.e. 4 seconds.

Having thus obtained this decrease in rate, element 20 sends a signal to unit 18 of the numerical control which actuates the path for $l_o$ of the trajectory at low rate.

The EDM machine used in this example is fitted with a built-in automatic regulating circuit, used to slave the relative wire-part movement rate to the new conditions due to modification of the pulse frequency. Therefore, the speed at which the wire cuts $l_o$ is set automatically.

When the wire has run computed distance $l_o$ as indicated above, the computing unit then sends a signal to numerical control element 19 so that the latter actuates an initial increase $Q_1 = F/8$ in frequency after having machined a length Δl = 100 μm of the trajectory.

As described above for the decrease in frequency, the reverse operation is used: the frequency is increased three times by a quantity equal to F/4, waiting until the wire has machined a length of 100 μm between two successive increases, therefore, in this example, by again observing two steps. In this manner, the frequency is returned to its initial value F.

We shall now described machining of an arc.

The arc in question has a radius of curvature of 1.26 mm. The procedure is the same as that described above, involving decrementing and incrementing the pulse frequency by quantity $Q_1$, $Q_2$ and $Q_3$ over 3 successive variations (according to the table providing the relation between the radius of curvature and the low frequency), so as to reduce the frequency to $F(X) = F/4$, therefore by observing 2 steps of 4 seconds.

This equation, already stored on element 17, has also enabled element 20 of computing unit 14 to select an appropriate value for reduced frequency F(X) automatically, and sending of signals corresponding to the number of steps desired. In the case of an edge or angle, quantities $Q_1$ to $Q_4$ indicated above remain the same. At the end of the last step, before restarting part-wire relative movement, element 20 of computing unit 14 sends a signal to element 19 of the numerical control to activate the path at low rate.

According to an option, frequency F is reduced in the case of an angle to F(X)=F/16, over 4 successive decreases, with $Q_1=F/2$, $Q_2=F/4$, $Q_3=F/8$ and $Q_4=F/16$, therefore by decreasing frequency f by half after each step. Similarly, the frequency is doubled after each step to return it to its initial value F.

An advantage of this invention is the simplification it provides, both from the equipment and programming viewpoints. It is no longer necessary to regulate the sparking distance subsequent to variations imposed on pulse frequency, as the machining operation described in CH 654.233, for example, demanded. Moreover, the software corresponding to a variation in stationary machining is much simpler than that required by the strategy of patent CH 654.233, where it was necessary to provide a parameter variation before the direction change, appropriate to sufficiently decrease wire slack.

The parameter automatic variation procedures of the present invention are much simpler than those described in the state of the art, for example in EP 67 876: detection of wire slack and the width of the gap cut (calling for stopping of machining) and calculation of a low speed according to a formula in which the radius of curvature, the gap and slack intervene, the latter depending on the type of wire, the thickness of the part, the distance between the wire guides, the injection pressure, the machining power, and the wire mechanical tension, etc. The procedures, according to the present invention, do not require any stoppage of machining and do not require a special circuit with sensors enabling slack and gap to be measured. These procedures are independent of most of these factors, and in particular of the thickness of the part and wire slack. These procedures do not call for a variation in feed rate. Moreover, they do not call for correction of the trajectory stored to compensate for faults in geometry due to wire slack.

The present invention can be used not only to vary the machining conditions so as to machine an angle or arc at an appropriate machining rate, but also to stop or continue a machining operation if, for example, there is a voluntary stoppage of a reduction in rate subsequent to the appearance of a risk of breakage or short-circuits. In particular, this invention prevents short-circuits when restarting a machining operation.

We claim:

1. A device for an EDM machine for cutting with an electrode-wire according to a predetermined trajectory, said device including a generator connected between said electrode wire and a workpiece to be machined for emitting voltage pulses, and a numerical unit for controlling the relative movements between said workpiece and wire guides guiding said electrode wire, said numerical unit also controlling the rate of the voltage pulses emitted by the generator, said device further comprising:
   a computing unit programmed to determine at least one point on said predetermined trajectory at which said relative movements between said workpiece and said wire guides must be stopped and a stepped variation of at least one parameter affecting machining conditions must be initiated, said computing unit being equipped to send corresponding signals to a numerical control element,
   a delay circuit equipped to send a signal to said numerical control element at predetermined intervals from the start of said stepped variation of said at least one parameter,
   said numerical control element being connected to said computing unit and to said delay circuit, said numerical control element actuating said stepped variation of said at least one parameter in reply to said signals from said computing unit and said delay circuit, said numerical control element terminating said stepped variation when said at least one parameter has reached a final scheduled value, and
   actuators connected to said numerical control element, said actuators being equipped to activate said stepped variations of said at least one parameter by given quantities.

2. The device according to claim 1, wherein said means for sending a signal to said numerical control element issues said signal after a given time period.

3. The device according to claim 1, wherein said numerical control element is equipped to control a variation in the frequency of the voltage pulses emitted by the generator.

4. The device according to claim 1, wherein said numerical control element is equipped to reduce said at least one parameter at the end of each of said stepped variation by a predetermined quantity, the value of which decreases as the reduction of said at least one parameter progresses.

5. The device according to claim 1, wherein said numerical control element decreases the value of said at least one parameter by half in reply to said signal sent by said delay circuit.

6. The device according to claim 1, further comprising means for sending a signal to said numerical control element as soon as the electrode-wire has cut a predetermined length from a given point of the trajectory.

7. The device according to claim 1, wherein said numerical control element terminates said stepped variation when said at least parameter returns to an initial value.

8. The device according to claim 1, wherein said numerical control element terminates said stepped variation when a predetermined number of steps have been performed.

9. The device according to claim 1, wherein said numerical control element terminates said stepped variation when said stepped variation has completed a given time period.

10. The device according to claim 1, wherein said numerical control element doubles the value of said at least one parameter in reply to said signal sent by said delay circuit.

11. The device according to claim 1, wherein the duration of each of said signals issued by said delay circuit to said numerical control element varies according to a predetermined function.

12. The device according to claim 11, wherein the duration of each of said signals issued by said delay circuit to said numerical control element is equal to a predetermined constant.

13. A control process for an EDM machine cutting with a wire-electrode according to a predetermined trajectory, said control process varying at least one maching parameter (V) up to a scheduled value (V') when the electrode-wire reaches an apex of an angle or approaches an arc, said control process returning said value (V') to its initial value (V) at the end of cutting of the angle or arc, said control process comprising the steps of:

calculating points along said trajectory at which said variation of said at least one machining parameter must be initiated, stopping the relative movement between the electrode-wire and a workpiece when the wire reaches one of said calculated points, varying the value of said at least one parameter (V) by a predetermined quantity ($Q_2$), additionally varying said at least one parameter (V) after a predetermined period of time ($\Delta t_1$) by a predetermined quantity ($Q_2$), said varying being continued in steps of predetermined durations ($\Delta t_x$) up to the final desired value (V')

continuing the relative movement between the electrode-wire and said workpiece according to the final value (V') reached by said at least one parameter, varying said at least one parameter in an opposite direction when said wire reaches a next predetermined point, in successive steps of predetermined durations ($\Delta t_x$), until said at least one parameter has reached its initial value (V).

14. The process according to claim 13, wherein said times ($\Delta t_x$) and ($\Delta t_x$) have the same value.

15. The process according to claim 13, wherein said step of calculating points along a trajectory includes an arithmetic operation for determining a distance ($l_o$) which is run while said at least one parameter is maintained at its value (V'), said distance ($l_o$) is determined by the following:

$$l_o = \frac{R + g}{\tan \alpha/2}$$

where R is the radius of the wire, g the sparking distance and $\alpha$ the value of the angle to be cut.

16. The process according to claim 13, wherein said step of calculating points along a trajectory includes an arithmetic operation for determining a distance ($l_o$) which is run while said at least one parameter is maintained at its value (V'), said equation indicated as:

$l_o = \gamma r$, where $\gamma$ is the value in radians of the angle corresponding to an arc to be cut, and r the radius of curvature of said arc.

17. The control process of claim 13, wherein said step of additional variations of said at least one parameter (V) after a predetermined period ($\Delta t_x$) by a predetermined quantity ($Q_x$) continues until a predetermined number of steps have been performed.

18. The control process of claim 13, wherein said step of varying at least one parameter in an opposite direction corresponds to the cutting of predetermined lengths ($\Delta l_x$) by the wire-electrode.

19. The control process of claim 18, wherein said step by varying said at least one parameter in an opposite direction continues until a predetermined number of steps have been performed.

20. The control process of claim 18, wherein said step of varying said at least one parameter in opposite direction continues for a predetermined period of time.

21. The control process of claim 18, wherein said step of varying said at least one parameter in an opposite direction continues until a predetermined length of a workpiece has been cut by the wire-electrode.

* * * * *